(12) United States Patent
Hirono et al.

(10) Patent No.: US 12,270,759 B2
(45) Date of Patent: Apr. 8, 2025

(54) GAS DETECTION DEVICE

(71) Applicant: Kabushiki Kaisha Toshiba, Tokyo (JP)

(72) Inventors: Masatoshi Hirono, Yokohama Kanagawa (JP); Shinji Saito, Yokohama Kanagawa (JP); Tsutomu Kakuno, Fujisawa Kanagawa (JP); Rei Hashimoto, Tokyo (JP); Kei Kaneko, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 240 days.

(21) Appl. No.: 18/168,838

(22) Filed: Feb. 14, 2023

(65) Prior Publication Data
US 2023/0296504 A1    Sep. 21, 2023

(30) Foreign Application Priority Data
Mar. 18, 2022  (JP) .................. 2022-043748

(51) Int. Cl.
*G01N 21/3504*    (2014.01)
(52) U.S. Cl.
CPC ............... *G01N 21/3504* (2013.01); *G01N 2201/06113* (2013.01); *G01N 2201/0636* (2013.01)
(58) Field of Classification Search
CPC ..... G01N 21/3504; G01N 2201/06113; G01N 2201/0636
See application file for complete search history.

(56) References Cited

U.S. PATENT DOCUMENTS

| | | |
|---|---|---|
| 5,146,290 A | 9/1992 | Hartrumpf |
| 6,881,925 B1 | 4/2005 | Sato et al. |
| 2020/0088632 A1 | 3/2020 | Bjoroy |

FOREIGN PATENT DOCUMENTS

| | | | | |
|---|---|---|---|---|
| GB | 2274163 A | * | 7/1994 | ......... G01N 21/3504 |
| JP | S61-122552 | | 6/1986 | |
| JP | H03-44503 | | 2/1991 | |
| JP | 2000-155220 | | 6/2000 | |
| JP | 2005-106521 | | 4/2005 | |
| JP | 2017-062176 | | 3/2017 | |
| JP | 2020-501161 | | 1/2020 | |

* cited by examiner

*Primary Examiner* — Kiho Kim
(74) *Attorney, Agent, or Firm* — Knobbe, Martens, Olson & Bear, LLP

(57) ABSTRACT

A gas detection device according to an embodiment includes a first light source irradiating infrared, a second light source irradiating visible light, a low-pass filter that transmits the infrared irradiated from the first light source, reflects the visible light irradiated from the second light source, and aligns an optical axis of the visible light with an optical axis of the infrared, a first retroreflector on which the infrared and the visible light having the aligned optical axes are incident, a first detecting part detecting the infrared reflected by the first retroreflector, and a scattering body located at a center of the first retroreflector.

20 Claims, 3 Drawing Sheets

GAS DETECTION DEVICE

CROSS-REFERENCE TO RELATED APPLICATIONS

This application is based upon and claims the benefit of priority from Japanese Patent Application No. 2022-043748, filed on Mar. 18, 2022; the entire contents of which are incorporated herein by reference.

FIELD

Embodiments described herein relate generally to a gas detection device.

BACKGROUND

Molecules have unique absorption spectra for infrared. Therefore, by irradiating infrared into an object space, a gas in the space can be detected, and component analysis of the gas in the space can be performed.

For example, a proposed gas detection device includes a light source, a retroreflector, and a space that is the detection object interposed between the light source and the retroreflector. In such a device, the center of the retroreflector and the optical axis of the irradiated infrared are aligned. For example, by irradiating visible light that is coaxial with the optical axis of the irradiated infrared on the retroreflector, the center of the retroreflector and the optical axis of the visible light that is coaxial with the optical axis of the infrared are aligned.

However, the visible light that is incident on the retroreflector is reflected parallel to the incident direction in the opposite direction of the incident direction. Therefore, it has been difficult for an operator or the like outside the retroreflector to visually check the incident position of the visible light on the retro ref lector.

It is therefore desirable to develop a gas detection device that can easily align the center of the retroreflector and the optical axis of the irradiated infrared.

DETAILED DESCRIPTION

Figure 1:
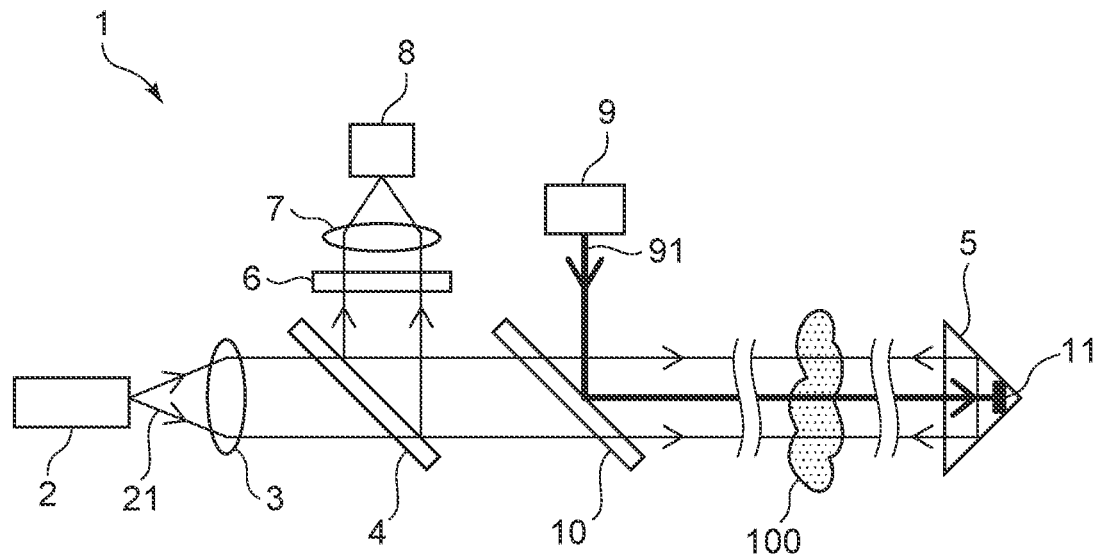
FIG. 1 is a schematic view illustrating a gas detection device according to an embodiment.

A gas detection device according to an embodiment includes a first light source irradiating infrared, a second light source irradiating visible light, a low-pass filter that transmits the infrared irradiated from the first light source, reflects the visible light irradiated from the second light source, and aligns an optical axis of the visible light with an optical axis of the infrared, a first retroreflector on which the infrared and the visible light having the aligned optical axes are incident, a first detecting part detecting the infrared reflected by the first retroreflector, and a scattering body located at a center of the first retroreflector.

Exemplary embodiments will now be described with reference to the drawings. Similar components in the drawings are marked with like reference numerals. Similar components in the drawings are marked with the same reference numerals; and a detailed description is omitted as appropriate.

FIG. 1 is a schematic view illustrating a gas detection device 1 according to an embodiment.

As shown in FIG. 1, the gas detection device 1 includes, for example, a first light source 2, a collimator lens 3, a beam splitter 4, a retroreflector 5 (corresponding to an example of a first retroreflector), a band-pass filter 6, a lens 7, a detecting part 8 (corresponding to an example of a first detecting part), a second light source 9, a low-pass filter 10, and a scattering body 11.

The first light source 2 irradiates light 21. The wavelength of the light 21 is, for example, not less than 0.7 μm. The light 21 is, for example, infrared. Because molecules have unique absorption spectra for infrared, by irradiating infrared on a gas 100, the gas 100 can be detected, and component analysis of the gas 100 can be performed.

The first light source 2 is, for example, a quantum cascade laser (QCL) that includes a compound semiconductor. For example, the oscillation wavelength of the quantum cascade laser can be changed in a range of 4 μm to 16 μm. Therefore, the wavelength of the light 21 can be changed by using a quantum cascade laser as the first light source 2. For example, if the components of the gas 100 to be detected are known beforehand, the light 21 of a wavelength that is easily absorbed by the gas 100 can be irradiated from the first light source 2. Thus, for example, the detection accuracy of gas leaks and the like can be increased. For example, when analyzing the components of the gas 100 to be detected, the wavelength of the light 21 irradiated on the gas 100 can be oscillated. Thus, the analysis accuracy of the components of the gas 100 can be increased.

The collimator lens 3 is located between the first light source 2 and the retroreflector 5. The light 21 that is irradiated from the first light source 2 is incident on the collimator lens 3. The collimator lens 3 collimates the incident light 21 into parallel light. When the light 21 is collimated into parallel light, the light 21 can reach further at higher intensity. Therefore, remote detection and/or remote analysis of the gas 100 are possible.

The beam splitter 4 is located between the collimator lens 3 and the retroreflector 5. The beam splitter 4 transmits the light 21 collimated into the parallel light by the collimator lens 3. Also, the beam splitter 4 reflects the light 21 reflected by the retroreflector 5.

As described below, the light 21 and light 91 that have optical axes aligned by the low-pass filter 10 are incident on the retroreflector 5. The retroreflector 5 reflects the incident light 21 parallel to the incident direction in the opposite direction of the incident direction. The light 21 that is reflected by the retroreflector 5 is incident on the beam splitter 4. The light 21 that is incident on the beam splitter 4 is reflected by the beam splitter 4 and is incident on the detecting part 8.

The band-pass filter 6 is located between the beam splitter 4 and the detecting part 8. The light 21 that is reflected by the beam splitter 4 is incident on the band-pass filter 6. The band-pass filter 6 transmits the light 21 and cuts light of different wavelengths from the light 21. For example, the band-pass filter 6 is provided to suppress the noise due to ambient light.

The lens 7 is located between the band-pass filter 6 and the detecting part 8. The lens 7 condenses the light 21 passing through the band-pass filter 6. By providing the lens 7, the detection sensitivity and/or analysis accuracy of the gas 100 can be increased.

The light 21 that is condensed by the lens 7 is incident on the detecting part 8. The detecting part 8 detects the light 21 reflected by the retroreflector 5. As described above, molecules have unique absorption spectra for infrared. Therefore, the light 21 that is irradiated from the first light source 2 is incident on the gas 100; and infrared of prescribed wavelengths according to the components of the gas 100 is absorbed. Accordingly, by using the detecting part 8 to detect the light 21 reflected by the retroreflector 5 after passing through the gas 100, the presence of the gas 100 (e.g., a gas leak) can be detected, and the components of the gas 100 can be analyzed.

The detecting part 8 can be, for example, a sensor that detects infrared. The detecting part 8 can be, for example, a MCT sensor, i.e., a semiconductor sensor that uses mercury (Hg)·cadmium (Cd)·tellurium (Te).

As described above, when the light 21, i.e., infrared, is irradiated on the gas 100, a portion of the light 21 is absorbed by the gas 100. Therefore, the light-receiving amount (the light-receiving signal) that is detected by the detecting part 8 is reduced. However, the light-receiving amount that is detected by the detecting part 8 is reduced even when failure of the first light source 2 or the like causes the light intensity of the light 21 irradiated from the first light source 2 to be reduced. Therefore, there are cases where it cannot be discriminated whether the reduction of the light-receiving amount detected by the detecting part 8 is caused by the gas 100 or the first light source 2.

In such a case, the first light source 2 is controlled to modulate the wavelength of the light 21 in the region outside the optical absorption band of the gas 100. Then, it can be discriminated whether the reduction of the light-receiving amount detected by the detecting part 8 is caused by the gas 100 or the first light source 2 by comparing the light-receiving amount in the optical absorption band and the light-receiving amount in the region outside the optical absorption band detected by the detecting part 8.

Thus, misdetections can be suppressed.

Also, it can be discriminated whether the reduction of the light-receiving amount detected by the detecting part 8 is caused by the gas 100 or the first light source 2 by monitoring the light intensity of the light 21 irradiated from the first light source 2 and comparing the light intensity with the light-receiving amount detected by the detecting part 8.

Thus, misdetections can be suppressed without modulating the wavelength of the light 21.

The monitoring of the light intensity of the light 21 irradiated from the first light source 2 is described below (see FIG. 2).

Here, to increase the efficiency of the reflection of the light 21 by the retroreflector 5, it is favorable to align the center of the retroreflector 5 and the optical axis of the light 21 collimated into the parallel light. However, because the light 21 is infrared, the light 21 easily diverges when propagating. Therefore, the spot diameter of the light 21 is relatively large at the retroreflector 5 located at the position separated from the first light source 2. Also, because the light 21 is infrared, the light 21 cannot be visually checked. It is therefore difficult to align the center of the retroreflector 5 and the optical axis of the light 21.

Therefore, the second light source 9, the low-pass filter 10, and the scattering body 11 are included in the gas detection device 1.

The second light source 9 irradiates the light 91. The light 91 is, for example, visible light. The spot diameter of the light 91 is less than the spot diameter of the light 21. The light 91, i.e., visible light, can be used as guide light that is used when aligning the center of the retroreflector 5 and the optical axis of the light 21. The second light source 9 is, for example, a visible light semiconductor laser. When the second light source 9 is a visible light semiconductor laser, the light 91 can reach further with smaller beam width.

The low-pass filter 10 is located between the beam splitter 4 and the retroreflector 5. The low-pass filter 10 reflects the light 91 and transmits the light 21 that has a longer wavelength than the light 91. The light 91 that is irradiated from the second light source 9 and reflected by the low-pass filter 10 is incident on the retroreflector 5. As described above, the light 91 is used as guide light. Therefore, the optical axis of the light 91 reflected by the low-pass filter 10 is aligned with the optical axis of the light 21. For example, the spot of the light 21 is made visible by using a photosensitive material or the like; and the light 91 is irradiated on the center of the visible spot of the light 21. Thus, the optical axis of the light 91 reflected by the low-pass filter 10 can be aligned with the optical axis of the light 21. In such a case, the irradiation position of the light 91 can be adjusted by changing the tilt angle of the low-pass filter 10.

In other words, the low-pass filter 10 can transmit the light 21 irradiated from the first light source 2, reflect the light 91 irradiated from the second light source 9, and align the optical axis of the light 91 with the optical axis of the light 21.

If the optical axis of the light 91 is aligned with the optical axis of the light 21, for example, it is sufficient to move the position of the retroreflector 5 so that the light 91 is incident on the center of the retroreflector 5. Thus, the center of the retroreflector 5 and the optical axis of the light 21 can be aligned.

However, the retroreflector 5 reflects the incident light 91 parallel to the incident direction and in the opposite direction of the incident direction. Therefore, the light 91 that is reflected by the retroreflector 5 does not travel toward the operator performing the position adjustment of the retroreflector 5. As a result, it is difficult for the operator to visually check the incident position of the light 91 on the retroreflector 5, and it is therefore difficult to align the center of the retroreflector 5 and the optical axis of the light 21.

Therefore, the scattering body 11 is located at the retroreflector 5. The scattering body 11 can be located at a position overlapping the center of the retroreflector 5 when viewed along the incident direction of the light 91. The scattering body 11 scatters the incident light 91. For example, the scattering body 11 causes Rayleigh scattering of the incident light 91. For example, the scattering body 11 can include multiple particles that are smaller than the wavelength of the light 91. The particles that are included in the scattering body 11 can be, for example, particles of titanium oxide, etc. For example, the scattering body 11 can also diffusely reflect the incident light 91. In such a case, for example, the scattering body 11 can be formed from paper or the like, or can include barium sulfate, etc.

A portion of incident light 91 on the scattering body 11 is irradiated in a direction crossing the incident direction of the light 91. It is therefore easy for the operator to visually check the incident position of the light 91 on the retroreflector 5.

Because the light 21 that is incident on the scattering body 11 is also scattered, the light 21 that is incident on the scattering body 11 cannot be detected by the detecting part 8. However, the dimension of the scattering body 11 can be small because the spot diameter of the light 91 is small. Therefore, the light intensity of the light 21 that can no longer be detected due to the scattering body 11 can be suppressed, which in turn can suppress the effects on the detection sensitivity and/or analysis accuracy.

As described above, by using the gas detection device 1 according to the embodiment, the center of the retroreflector 5 and the optical axis of the irradiated light 21 can be easily aligned. Therefore, the light 21 that is incident on the retroreflector 5 can be efficiently reflected, which in turn can increase the detection sensitivity and/or analysis accuracy.

Monitoring of the light intensity of the light 21 irradiated from the first light source 2 will now be described.

Figure 2:
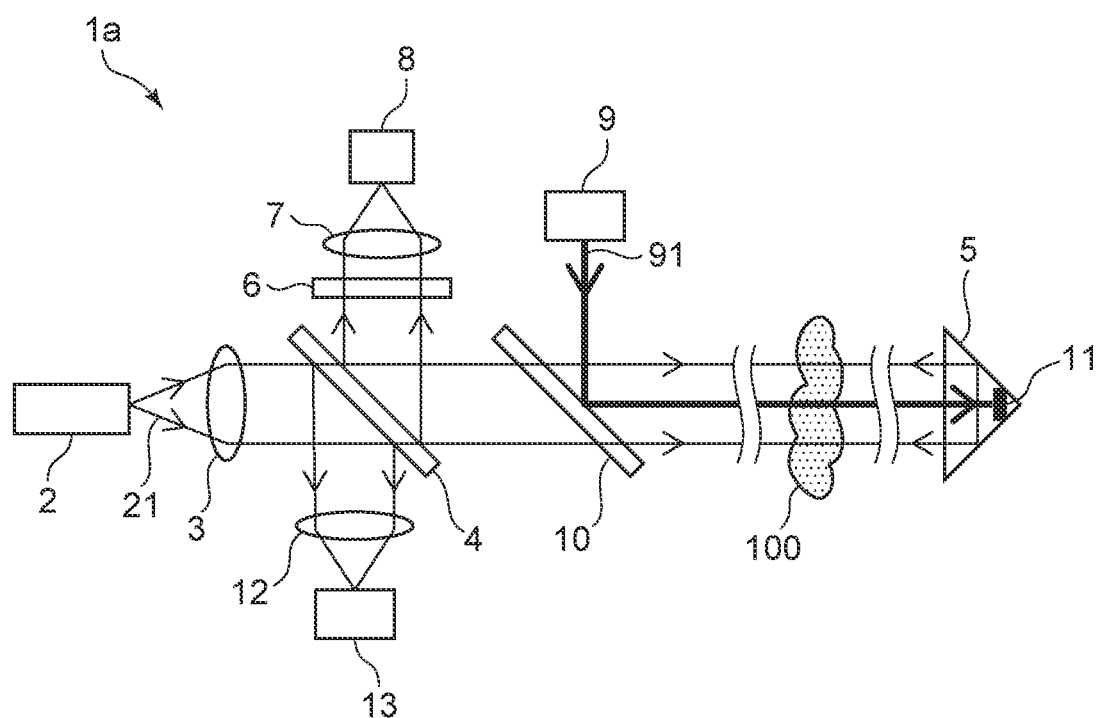
FIG. 2 is a schematic view illustrating a gas detection device according to another embodiment.

FIG. 2 is a schematic view illustrating a gas detection device 1a according to another embodiment.

In the gas detection device 1a, a monitoring function of the light intensity of the light 21 is added to the gas detection device 1 described above.

As shown in FIG. 2, the gas detection device 1a includes, for example, the first light source 2, the collimator lens 3, the beam splitter 4, the retroreflector 5, the band-pass filter 6, the lens 7, the detecting part 8, the second light source 9, the low-pass filter 10, the scattering body 11, a lens 12, and a detecting part 13 (corresponding to an example of a second detecting part).

As described above, the beam splitter 4 transmits the light 21 that is collimated into the parallel light by the collimator lens 3. At this time, a portion of the light 21 incident on the beam splitter 4 is reflected by the beam splitter 4. Therefore, the monitoring of the light intensity of the light 21 can be performed by detecting the light 21 reflected by the beam splitter 4.

The lens 12 condenses the light 21 reflected by the beam splitter 4. By providing the lens 12, the detection sensitivity and/or detection accuracy of the detecting part 13 can be increased.

The light 21 that is condensed by the lens 12 is incident on the detecting part 13. The detecting part 13 can be, for example, a sensor that detects infrared. The detecting part 13 can be, for example, a MCT sensor.

For example, the monitoring of the light intensity of the light 21 can be performed as follows.

The ratio of the light-receiving signal (the light-receiving amount) from the detecting part 13 and the light-receiving signal (the light-receiving amount) from the detecting part 8 does not change even when the light intensity of the light 21 irradiated from the first light source 2 changes, but the ratio does change when the light 21 is irradiated on the gas 100 (when a portion of the light 21 is absorbed by the gas 100).

Therefore, it can be discriminated whether the reduction of the light-receiving amount detected by the detecting part 8 is caused by the gas 100 or the first light source 2.

By using the gas detection device 1a, similarly to the gas detection device 1 described above, the center of the retroreflector 5 and the optical axis of the irradiated light 21 can be easily aligned.

Figure 3:
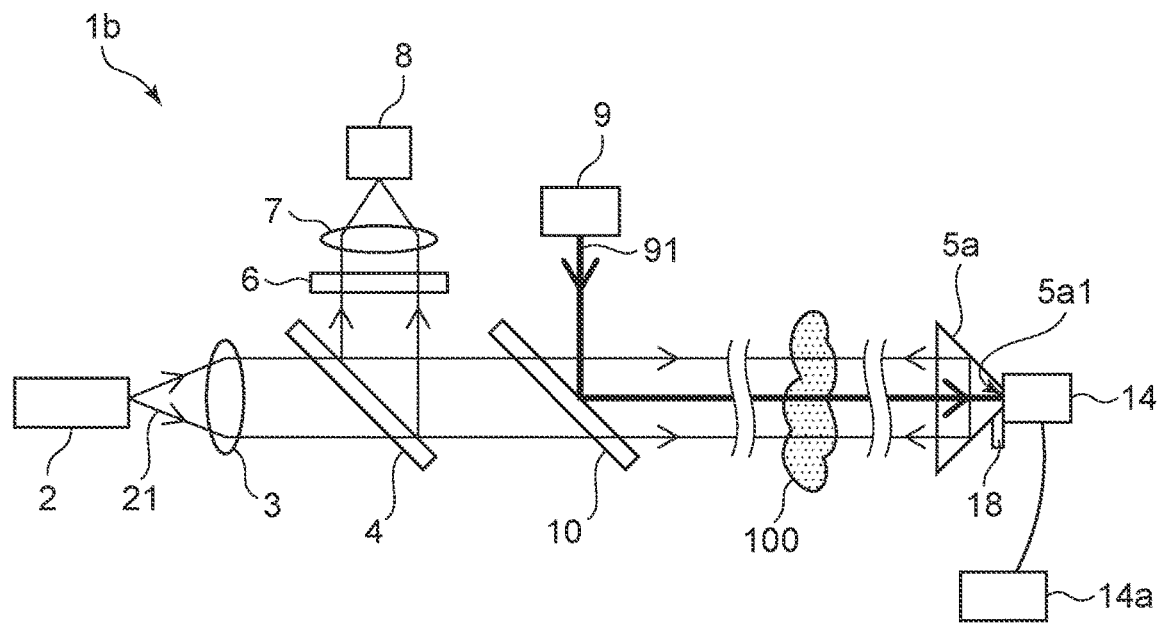
FIG. 3 is a schematic view illustrating a gas detection device according to another embodiment.

FIG. 3 is a schematic view illustrating a gas detection device 1b according to another embodiment.

As shown in FIG. 3, the gas detection device 1b includes, for example, the first light source 2, the collimator lens 3, the beam splitter 4, a retroreflector 5a (corresponding to an example of a second retroreflector), the band-pass filter 6, the lens 7, the detecting part 8 (corresponding to an example of the first detecting part), the second light source 9, the low-pass filter 10, and a detecting part 14 (corresponding to an example of a third detecting part).

Similarly to the retroreflector 5 described above, the light 21 and the light 91 that have aligned optical axes are incident on the retroreflector 5a. The retroreflector 5a reflects the incident light 21 parallel to the incident direction and in the opposite direction of the incident direction.

The detecting part 8 detects the light 21 reflected by the retroreflector 5a.

A hole 5a1 is provided at the center of the retroreflector 5a. The detecting part 14 is located at the side of the retroreflector 5a opposite to the incident side of the light 21. Therefore, the light 91 that is irradiated from the second light source 9 can be incident on the detecting part 14 via the hole 5a1.

The detecting part 14 detects the light 91 via the hole 5a1 of the retroreflector 5a. The detecting part 14 can be, for example, a sensor detecting the light 91, i.e., visible light. A transmitting part 14a can also be connected to the detecting part 14. The transmitting part 14a transmits the light-receiving signal from the detecting part 14 toward an external device, etc. For example, the transmitting part 14a uses an optical signal, Wi-Fi (short-range radio communication), etc., to transmit the light-receiving signal toward the external device, etc.

As described above, the hole 5a1 is provided at the center of the retroreflector 5a. Therefore, the operator can align the center of the retroreflector 5a and the optical axis of the light 21 by adjusting the position of the retroreflector 5a based on the light-receiving signal from the detecting part 14.

For example, a moving device 18 that adjusts the position of the retroreflector 5a can also be included. The moving device 18 moves the position of the retroreflector 5a with respect to the lights 21 and 91 having the aligned optical axes. For example, the center of the retroreflector 5a and the optical axis of the light 91, and thereby the center of the retroreflector 5a and the optical axis of the light 21, can be aligned by providing the moving device 18 such as a two-axis robot or the like at the retroreflector 5a and by controlling the moving device 18 based on the light-receiving signal from the detecting part 14. Thus, the center of the retroreflector 5a and the optical axis of the light 21 can be aligned by automatic control.

By using the gas detection device 1b according to the embodiment, the center of the retroreflector 5a and the optical axis of the irradiated light 21 can be easily aligned. Therefore, the light 21 that is incident on the retroreflector 5a can be efficiently reflected, which in turn can increase the detection sensitivity and/or analysis accuracy.

Figure 4:
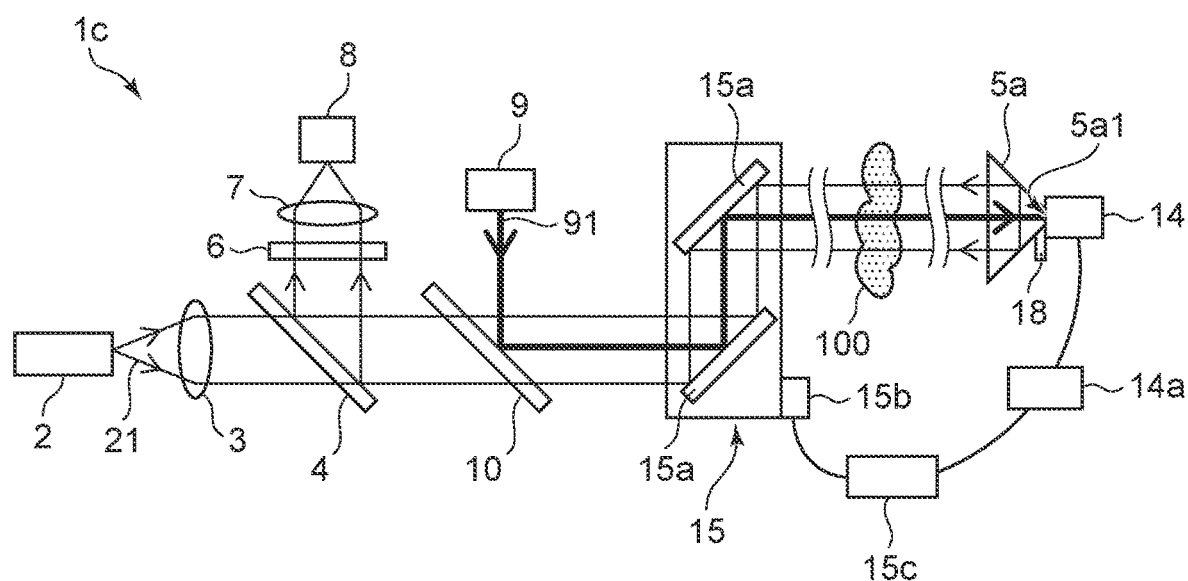
FIG. 4 is a schematic view illustrating a gas detection device according to another embodiment.

FIG. 4 is a schematic view illustrating a gas detection device 1c according to another embodiment.

As shown in FIG. 4, the gas detection device 1c includes, for example, the first light source 2, the collimator lens 3, the beam splitter 4, the retroreflector 5a, the band-pass filter 6, the lens 7, the detecting part 8, the second light source 9, the low-pass filter 10, the detecting part 14, and an irradiation position adjustment part 15.

The irradiation position adjustment part 15 controls the irradiation position on the retroreflector 5a of the lights 21 and 91 having the aligned optical axes.

The irradiation position adjustment part 15 includes, for example, a mirror 15a, a driver 15b, and a controller 15c.

A pair of the mirrors 15a can be included. The pair of mirrors 15a is rotatable. For example, one mirror 15a is provided to adjust the irradiation directions of the lights 21 and 91 in the horizontal direction. The other mirror 15a is provided to adjust the irradiation directions of the lights 21 and 91 in the vertical direction.

The driver 15b changes the angles of the pair of mirrors 15a to change the reflection angles of the lights 21 and 91, which in turn changes the irradiation positions of the lights 21 and 91 on the retroreflector 5a. The driver 15b can include, for example, a control motor such as a servo motor, etc.

The controller 15c controls the driver 15b based on the light-receiving signal from the detecting part 14 that is input via the transmitting part 14a. For example, the controller 15c changes the irradiation positions of the lights 21 and 91 on the retroreflector 5a by changing the angles of the pair of mirrors 15a based on the light-receiving signal from the detecting part 14.

The moving device 18 such as a two-axis robot or the like can also be located at the retroreflector 5a. In such a case, by controlling at least one of the irradiation position adjustment part 15 or the moving device 18, the controller 15c can align the center of the retroreflector 5a and the optical axis of the light 91, which in turn aligns the center of the retroreflector 5a and the optical axis of the light 21.

By using the gas detection device 1c according to the embodiment, the center of the retroreflector 5a and the optical axis of the light 21 can be aligned by automatic control. Therefore, higher efficiency of the alignment task can be realized.

Although the case where the scattering body 11 is located at the retroreflector 5 is described below, the case where the detecting part 14 is located at the retroreflector 5a is also similar.

Figure 5:
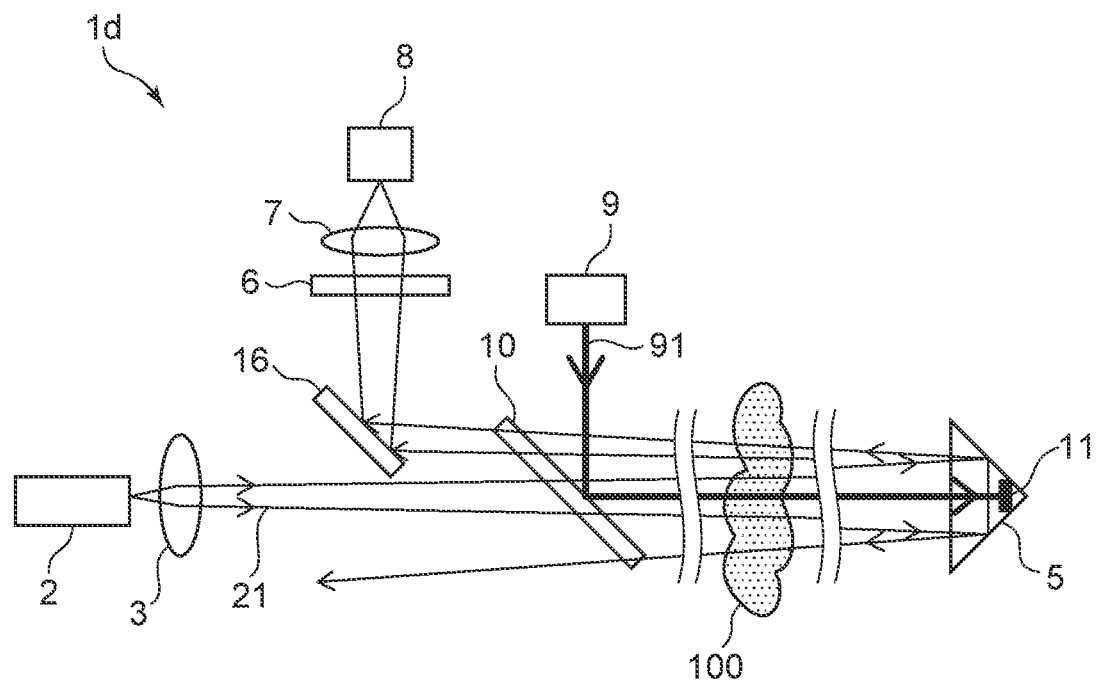
FIG. 5 is a schematic view illustrating a gas detection device according to another embodiment.

FIG. 5 is a schematic view illustrating a gas detection device 1d according to another embodiment.

As shown in FIG. 5, the gas detection device 1d includes, for example, the first light source 2, the collimator lens 3, the retroreflector 5, the band-pass filter 6, the lens 7, the detecting part 8, the second light source 9, the low-pass filter 10, the scattering body 11, and a mirror 16.

A portion of the light 21 reflected by the retroreflector 5 is incident on the mirror 16. The light 21 that is incident on the mirror 16 is reflected by the mirror 16. The light 21 that is reflected by the mirror 16 is incident on the detecting part 8 via the band-pass filter 6 and the lens 7.

Thus, the beam splitter 4 can be omitted.

By using the gas detection device 1d, similarly to the gas detection device 1 described above, the center of the retroreflector 5 and the optical axis of the irradiated light 21 can be easily aligned.

Figure 6:
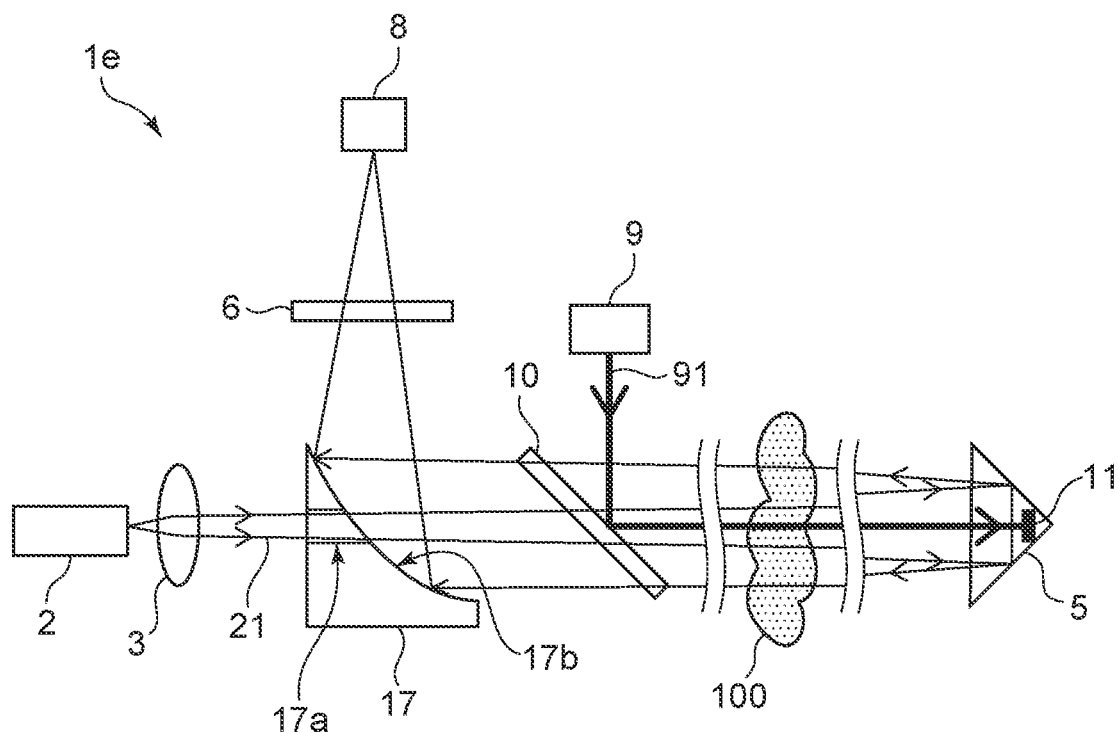
FIG. 6 is a schematic view illustrating a gas detection device according to another embodiment.

FIG. 6 is a schematic view illustrating a gas detection device 1e according to another embodiment.

As shown in FIG. 6, the gas detection device 1e includes, for example, the first light source 2, the collimator lens 3, the retroreflector 5, the band-pass filter 6, the detecting part 8, the second light source 9, the low-pass filter 10, the scattering body 11, and a parabolic mirror 17.

The parabolic mirror 17 includes a hole 17a. The light 21 that is irradiated from the first light source 2 is collimated into parallel light by the collimator lens 3. The light 21 that is collimated into the parallel light is irradiated on the retroreflector 5 via the hole 17a. The light 21 that is reflected by the retroreflector 5 is reflected by a reflecting surface 17b of the parabolic mirror 17. The light 21 is condensed by being reflected by the reflecting surface 17b. The condensed light 21 is incident on the detecting part 8.

Thus, the beam splitter 4 and the lens 7 can be omitted.

By using the gas detection device 1e, similarly to the gas detection device 1 described above, the center of the retroreflector 5 and the optical axis of the irradiated light 21 can be easily aligned.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A gas detection device, comprising:
   a first light source irradiating infrared;
   a second light source irradiating visible light;
   a low-pass filter transmitting the infrared irradiated from the first light source, reflecting the visible light irradiated from the second light source, and aligning an optical axis of the visible light with an optical axis of the infrared;
   a first retroreflector on which the infrared and the visible light having the aligned optical axes are incident;
   a first detecting part detecting the infrared reflected by the first retroreflector; and
   a scattering body located at a center of the first retroreflector.

2. The gas detection device according to claim 1, wherein a portion of the visible light incident on the scattering body is irradiated in a direction crossing an incident direction of the visible light.

3. The gas detection device according to claim 1, wherein the scattering body is located at a position overlapping the center of the first retroreflector when viewed along an incident direction of the visible light.

4. The gas detection device according to claim 1, wherein the scattering body causes Rayleigh scattering or diffused reflection of the incident visible light.

5. The gas detection device according to claim 1, wherein the first light source is a quantum cascade laser including a compound semiconductor.

6. The gas detection device according to claim 5, wherein the first light source is configured to change a wavelength of the infrared.

7. The gas detection device according to claim 1, further comprising:
   a collimator lens located between the first light source and the first retroreflector.

8. The gas detection device according to claim 7, wherein the collimator lens collimates the infrared irradiated from the first light source into parallel light.

9. The gas detection device according to claim 8, further comprising:
   a beam splitter located between the collimator lens and the low-pass filter, wherein
   the infrared collimated into the parallel light passes through the beam splitter and the low-pass filter and is incident on the first retroreflector, and
   the infrared reflected by the first retroreflector is reflected by the beam splitter and is incident on the first detecting part.

10. The gas detection device according to claim 9, further comprising:

a second detecting part detecting the infrared reflected by the beam splitter.

11. The gas detection device according to claim 1, further comprising:
a first mirror on which a portion of the infrared reflected by the first retroreflector is incident,
the infrared reflected by the first mirror being incident on the first detecting part.

12. The gas detection device according to claim 8, further comprising:
a parabolic mirror located between the collimator lens and the low-pass filter, wherein
the infrared collimated into the parallel light passes through a hole provided in the parabolic mirror and is incident on the first retroreflector, and
the infrared reflected by the first retroreflector is reflected by a reflecting surface of the parabolic mirror and is incident on the first detecting part.

13. A gas detection device, comprising:
a first light source irradiating infrared;
a second light source irradiating visible light;
a low-pass filter transmitting the infrared irradiated from the first light source, reflecting the visible light irradiated from the second light source, and aligning an optical axis of the visible light with an optical axis of the infrared;
a second retroreflector on which the infrared and the visible light having the aligned optical axes is incident, the second retroreflector including a hole at a center of the second retro reflector;
a first detecting part detecting the infrared reflected by the second retroreflector; and
a third detecting part located at a side of the second retroreflector opposite to an incident side of the infrared,
the third detecting part detecting the visible light via the hole of the second retroreflector.

14. The gas detection device according to claim 13, further comprising:
an irradiation position adjustment part controlling an irradiation position on the second retroreflector of the infrared and the visible light having the aligned optical axes.

15. The gas detection device according to claim 14, wherein
the irradiation position adjustment part includes:
a pair of second mirrors, the pair of second mirrors being rotatable; and
a driver configured to change an angle of the pair of second mirrors.

16. The gas detection device according to claim 15, wherein
the driver changes the irradiation position on the second retroreflector of the infrared and the visible light having the aligned optical axes.

17. The gas detection device according to claim 13, further comprising:
a moving device moving a position of the second retroreflector with respect to the infrared and the visible light having the aligned optical axes.

18. The gas detection device according to claim 13, further comprising:
a transmitting part transmitting a light-receiving signal from the third detecting part to an external device.

19. The gas detection device according to claim 15, further comprising:
a controller controlling the driver; and
a transmitting part transmitting a light-receiving signal from the third detecting part to the controller.

20. The gas detection device according to claim 19, wherein
the controller controls the driver based on a signal from the transmitting part, and
the driver changes the irradiation position on the second retroreflector of the infrared and the visible light having the aligned optical axes by changing the angle of the pair of second mirrors.

* * * * *